United States Patent
Hung

(10) Patent No.: US 10,229,054 B2
(45) Date of Patent: Mar. 12, 2019

(54) DATA STORAGE DEVICE AND METHOD FOR OPERATING NONVOLATILE MEMORY

(71) Applicant: Silicon Motion, Inc., Jhubei (TW)

(72) Inventor: Ying-Chun Hung, Baoshan Township (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/922,666

(22) Filed: Mar. 15, 2018

(65) Prior Publication Data

US 2018/0365143 A1   Dec. 20, 2018

(30) Foreign Application Priority Data

Jun. 19, 2017   (TW) .............................. 106120335 A

(51) Int. Cl.
G06F 12/02   (2006.01)
G06F 9/50   (2006.01)
G06F 3/06   (2006.01)

(52) U.S. Cl.
CPC .......... *G06F 12/0246* (2013.01); *G06F 3/064* (2013.01); *G06F 3/0604* (2013.01); *G06F 3/0608* (2013.01); *G06F 3/0616* (2013.01); *G06F 3/0679* (2013.01); *G06F 9/5016* (2013.01)

(58) Field of Classification Search
CPC .. G06F 12/0246; G06F 3/0604; G06F 3/0608; G06F 3/0616; G06F 3/064
USPC ....................................... 365/185.01–185.33
See application file for complete search history.

(56) References Cited

U.S. PATENT DOCUMENTS

| | | | | |
|---|---|---|---|---|
| 8,315,006 B1* | 11/2012 | Chahwan | ............. | G11B 5/5582 360/48 |
| 9,537,609 B2* | 1/2017 | Gladwin | ............. | G06F 11/2053 |
| 2012/0155167 A1 | 6/2012 | Uehara | | |
| 2013/0254458 A1 | 9/2013 | Pittelko | | |
| 2014/0040417 A1* | 2/2014 | Gladwin | ............. | G06F 11/2053 709/214 |
| 2016/0019137 A1* | 1/2016 | Ellis | .................... | G11C 11/5628 711/103 |

(Continued)

FOREIGN PATENT DOCUMENTS

| CN | 101494086 A | 7/2009 |
|---|---|---|
| TW | 201611034 A | 3/2016 |

(Continued)

OTHER PUBLICATIONS

Office Action of corresponding TW application, published on Oct. 24, 2018.

*Primary Examiner* — Harry W Byrne
(74) *Attorney, Agent, or Firm* — Wang Law Firm, Inc.

(57) ABSTRACT

An optimized operating method for a nonvolatile memory. A microcontroller allocates the nonvolatile memory to store write data requested by a host. According to a first accumulated amount of data written to the nonvolatile memory in a first writing mode and a second accumulated amount of data written to the nonvolatile memory in a second writing mode, the microcontroller allocates the nonvolatile memory to store write data requested by the host in the first writing mode and in the second writing mode alternately. In comparison with the first writing mode, more bits of data are stored in one storage cell in the second writing mode.

20 Claims, 4 Drawing Sheets

(56) References Cited

U.S. PATENT DOCUMENTS

2016/0284393 A1    9/2016  Ramalingam

FOREIGN PATENT DOCUMENTS

| TW | 201611035 A | 3/2016 |
| TW | 201621668 A | 6/2016 |
| TW | 201715399 A | 5/2017 |

* cited by examiner

DATA STORAGE DEVICE AND METHOD FOR OPERATING NONVOLATILE MEMORY

CROSS REFERENCE TO RELATED APPLICATIONS

This Application claims priority of Taiwan Patent Application No. 106120335, filed on Jun. 19, 2017, the entirety of which is incorporated by reference herein.

BACKGROUND OF THE INVENTION

Field of the Invention

The present invention relates to optimization of an operating method for nonvolatile memory.

Description of the Related Art

There are various forms of nonvolatile memory (NVM) used in data storage devices for long-term data retention, such as a flash memory, magnetoresistive RAM, ferroelectric RAM, resistive RAM, spin transfer torque-RAM (STT-RAM), and so on.

The lifespan of nonvolatile memory is limited. For example, the erasure of each block of a flash memory should be limited. When the number of times that a block has been erased exceeds an upper limit, the block should be protected from being further allocated to receive write data. With the increasing number of blocks exceeding the upper limit on the number of erasures, the flash memory approaches the end of its lifespan. Since the erasing demand depends on the operating method for the flash memory, how to optimize the operation of the nonvolatile memory and then extend the life of the device is a major issue in the technical field.

BRIEF SUMMARY OF THE INVENTION

A data storage device in accordance with an exemplary embodiment of the disclosure is provided.

A data storage device in accordance with an exemplary embodiment of the disclosure has a nonvolatile memory and a microcontroller. The microcontroller allocates the nonvolatile memory to store write data requested by a host. According to a first accumulated amount of data written to the non-volatile memory in a first writing mode and a second accumulated amount of data written to the non-volatile memory in a second writing mode, the microcontroller allocates the non-volatile memory to store write data requested by the host in the first writing mode and in the second writing mode alternately. In comparison with the first writing mode, more bits of data are stored in one storage cell in the second writing mode.

In an exemplary embodiment, the microcontroller escapes from the first writing mode to allocate the non-volatile memory to store write data requested by the host in the second writing mode when the first accumulated amount of data written to the non-volatile memory in the first writing mode exceeds a dynamic threshold value. The dynamic threshold value depends on the second accumulated amount of data written to the non-volatile memory in the second writing mode.

In an exemplary embodiment, the microcontroller escapes from the first writing mode to allocate the non-volatile memory to store write data requested by the host in the second writing mode when a judgment is true. The judgment determines whether a value, (WCnt#2+N)/M, is smaller than a value WCnt#1. WCnt#1 is the first accumulated amount of data written to the non-volatile memory in the first writing mode. N and M are numbers, and (WCnt#2+N)/M is the dynamic threshold value.

In an exemplary embodiment, N and M are provided to satisfy the warranty requirements of the data storage device.

In another exemplary embodiment, a method for operating a non-volatile memory, comprising: allocating a non-volatile memory to store write data requested by a host; and according to a first accumulated amount of data written to the non-volatile memory in a first writing mode and a second accumulated amount of data written to the non-volatile memory in a second writing mode, allocating the non-volatile memory to store write data requested by the host in the first writing mode and in the second writing mode alternately. In comparison with the first writing mode, more bits of data are stored in one storage cell in the second writing mode.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A nonvolatile memory may be a memory device for long-term data retention such as a flash memory, a magnetoresistive RAM, a ferroelectric RAM, a resistive RAM, a spin transfer torque-RAM (STT-RAM) and so on. The following discussion is regarding flash memory in particular as an example, but it is not intended to limit the application to the field of flash memory.

The flash memory is often used as a storage medium in today's data storage devices, for implementations of a memory card, a USB flash device, an SSD and so on. In another exemplary embodiment, the flash memory is packaged with a controller to form a multiple-chip package and named eMMC.

A data storage device using a flash memory as a storage medium can be applied to a variety of electronic devices, including a smartphone, a wearable device, a tablet computer, a virtual reality device, etc. A central processing unit (CPU) of an electronic device may be regarded as a host operating a data storage device equipped on the electronic device.

The storage space of a flash memory may be managed in blocks. Each block can be allocated to use a specific form to store data. For example, a block allocated to provide single level cells (SLCs) to store data is called an SLC block, and a block allocated to provide triple level cells (TLCs) to store data is called a TLC block. An SLC (single level cell) stores one single bit. A TLC (triple level cell) stores three bits. In the same physical storage size, the number of data stored by SLCs is only one-third of that stored by TLCs. In addition, a TLC block can be operated in a TLC writing mode or an SLC writing mode. In SLC writing mode, a TLC block imitates an SLC block, i.e., each storage cell of the TLC block capable of storage of 3-bit data is operated to store only one bit of data (valid data). In TLC writing mode, each storage cell of the TLC block stores 3 bits of data.

Figure 1A:
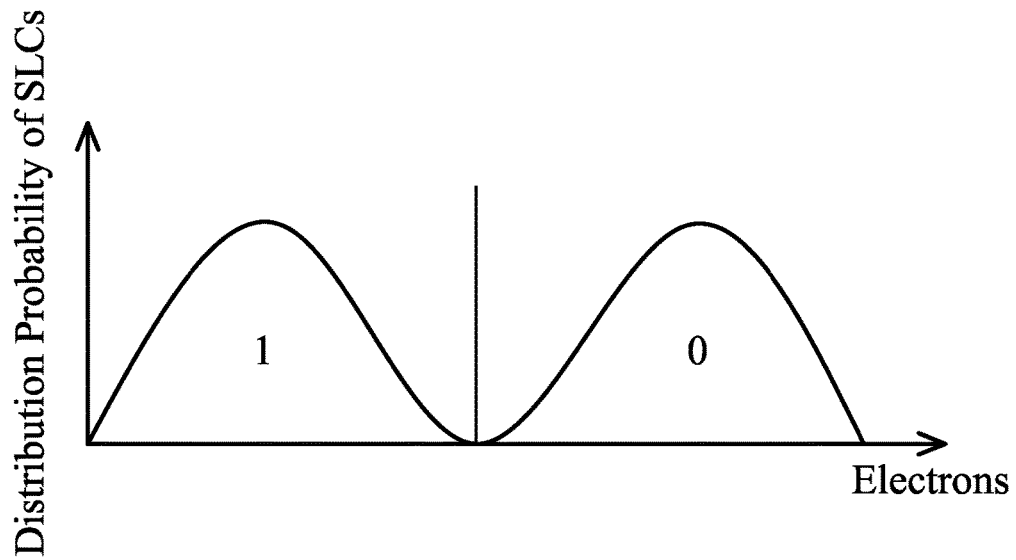
FIGS. 1A and 1B illustrate the distribution probability of storage cells for SLC and TLC techniques, respectively, with the logical meanings changed by modifying the floating gate electrons.
Figure 1B:
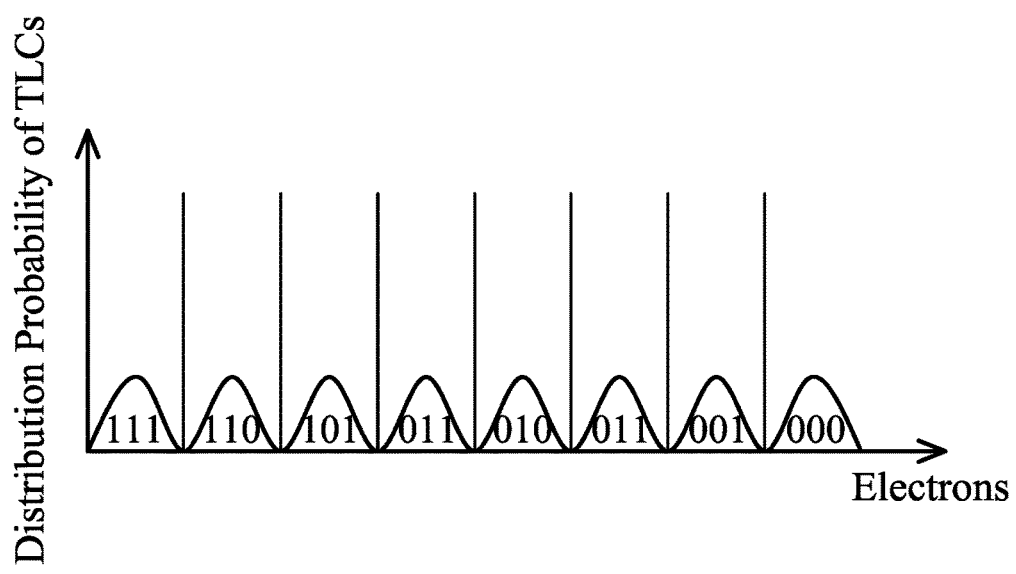

FIGS. 1A and 1B illustrate the distribution probability of storage cells for SLC and TLC techniques, respectively, with the logical meanings changed by modifying the floating gate electrons. As shown, the logical definition of a storage cell is determined according to the gate floating electrons of the storage cell. The logical boundary of SLC is clearer in comparison with the logical boundaries of TLC. Single level cells (SLCs) are more reliable and allow a faster writing speed. Triple level cells (TLCs) have an advantage of storage capacity. Single level cells (SLCs) involve write amplification issues. To store the same data, a much more space is required by SLC storage in comparison with TLC storage, resulting in excessive erasure operations and shortening the lifetime of the flash memory. Considering memory capacity, the data in SLCs are moved to TLCs (e.g., by garbage collection) during the proper time, which can also result in excessive erasure operations. Considering the lifespan of flash memory, how to optimize the allocation of blocks (e.g., switching between SLC and TLC writing modes) is the focus of the following discussion.

Figure 2:
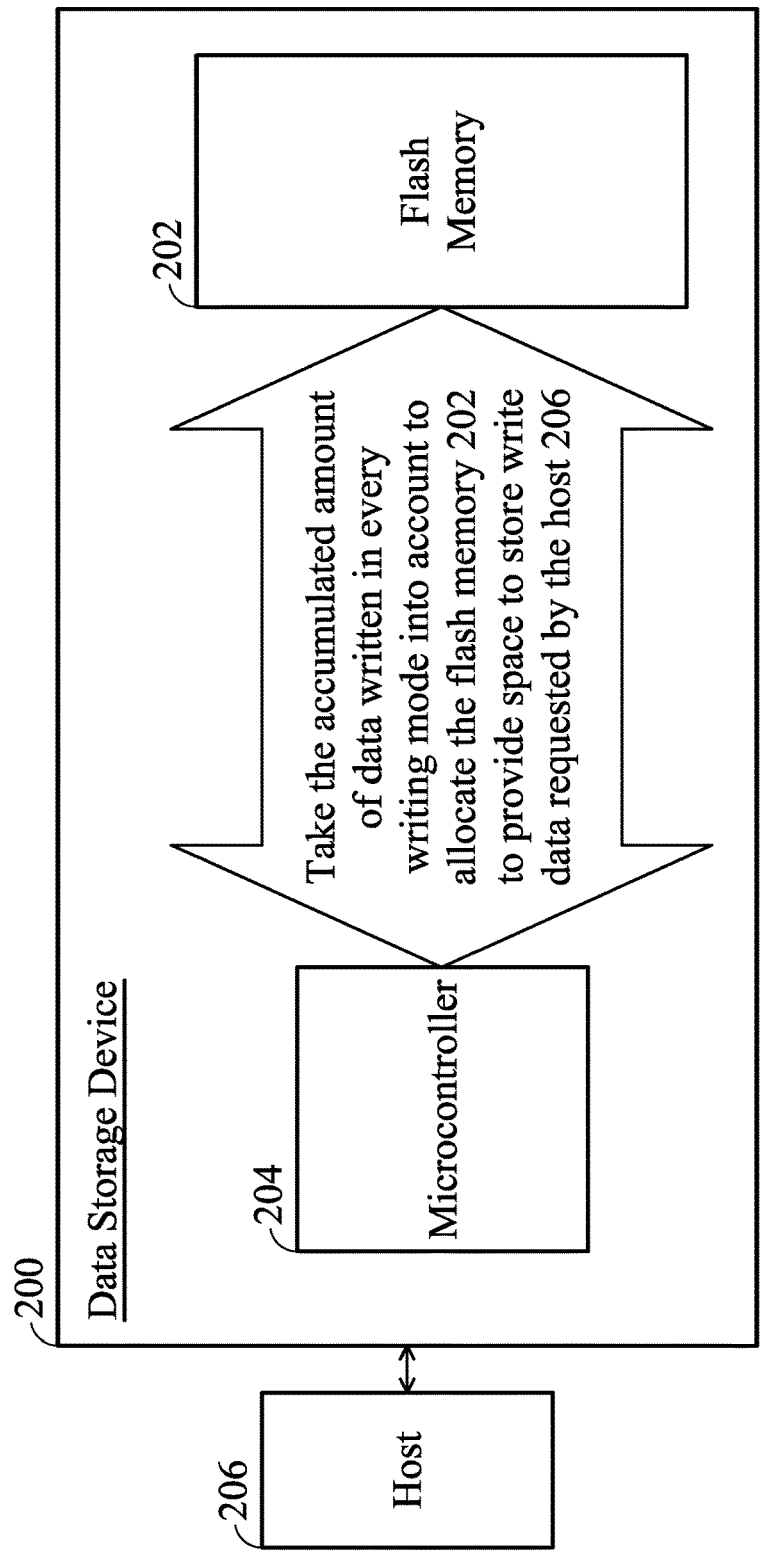
FIG. 2 is a block diagram depicting a data storage device 200 in accordance with an exemplary embodiment of the disclosure.

FIG. 2 is a block diagram depicting a data storage device 200 in accordance with an exemplary embodiment of the disclosure. The data storage device 200 uses a flash memory 202 as the storage medium and has a microcontroller 204. Through the microcontroller 204, a host 206 accesses the flash memory 202. The microcontroller 204 may be loaded with code and has computing hardware that executes the code. The storage space of the flash memory 202 is managed in units of blocks as described above, and can be individually allocated to store data in an SLC or TLC writing mode. The microcontroller 204 accumulates all the accumulated amount SLC_WCnt of data that the host 206 has ever requested to write to the flash memory 202 in the SLC writing mode, and another accumulated amount TLC_WCnt of data that the host 206 has ever requested to write to the flash memory 202 in the TLC writing mode. When allocating the flash memory 202 to provide storage space, the microcontroller 204 takes the accumulated amount SLC_WCnt and the accumulated amount TLC_WCnt into account to store data in the SLC writing mode and in the TLC writing mode alternately or particularly using the SLC writing mode or particularly using the TLC writing mode to store data. In the SLC writing mode, the microcontroller 204 allocates the flash memory 202 to provide blocks working as SLCs to store write data from the host 206. In the TLC writing mode, the microcontroller 204 allocates the flash memory 202 to provide blocks working as TLCs to store write data from the host 206. By properly switching between SLC and TLC writing modes, the SLC write amplification with the risk of surge in erase count will be suppressed, data storage device 200 life is not threatened and the data storage device 200 can maintain a certain level of performance during the warranty period. Even if the warranty period has nearly expired, the data storage device 200 still has enough capacity to switch to a high-speed and high-reliability SLC writing mode.

In an exemplary embodiment, the following judgment formula (1) is used:

$$((TLC\_WCnt+N)/M)<SLC\_WCnt \qquad (1)$$

where N and M are positive integers. The accumulated amount SLC_WCnt increases when data is written to SLC blocks. When the judgment formula (1) is true, the microcontroller 204 stops operating the flash memory 202 in the SLC writing mode and switches the flash memory 202 to the TLC writing mode. The flash memory 202 is operated in the SLC writing mode during a limited period and can be properly switched to the TLC writing mode. The flash memory 202, therefore, is not stuck in the SLC writing mode. The erase count of each block does not increase quickly due to long-term operation in the SLC writing mode.

The numerical values N and M of the judgment formula (1) may be set to meet the warranty requirements of the data storage device 200 and depend on the physical characteristics of the flash memory 202. In an exemplary embodiment of the data storage device 200, the amount of write data in warranty is 72T, the flash memory 202 has 900 blocks, each block is capable of storing 144M data, and the upper limit for erasure of each block is 1500 times. For each block, 583 incidents (72T/(900*144M)) of erasure may happen for the guaranteed 72T write data of the data storage device 200. Considering the upper limit, 1500 times, of the erasure of each block, there are 916 erase counts left for each block to be spent on SLC writing mode. In the judgment formula (1), N may be 12T and M may be 12, so that the 916 incidents of SLC block erasure can happen evenly over the life cycle of the flash memory 202. In another exemplary embodiment, considering the SLC write amplification phenomenon, 1166 incidents (583*2) of erasure of each block may be spent on the guaranteed amount of write data. Less erasure can be spent on additional data storage. The numerical values N and M in the judgment formula (1) can also have a corresponding design.

In another exemplary embodiment, the following judgment formula (2) is used:

$$SpareBlk\_Num>SLC\_Th \qquad (2)$$

SpareBlk_Num is the total number of spare blocks in the flash memory 202. SLC_Th is a threshold for switching the flash memory 202 to the SLC writing mode. When allocating the flash memory 202 to provide space to store data from the host 206, the microcontroller 204 checks the judgment formula (2). If satisfied, the spare block within the flash memory 202 is sufficient, not necessary to pursue storage density. The microcontroller 204 operates the flash memory 202 in the SLC writing mode, making good use of the high reliability and high write performance of SLC writing mode. The judgment formula (2) shows a condition to be satisfied to switch the flash memory to SLC writing mode.

In an exemplary embodiment, when no read or write requests are issued from the host 206 to the flash memory 202 or when the system is idle, the microcontroller 204 moves the data written to the flash memory in the SLC writing mode to TLC blocks and thereby the data density is improved. The aforementioned data movement increases the number of spare blocks, facilitating the judgment of the judgment formula (1) being true.

Figure 3:
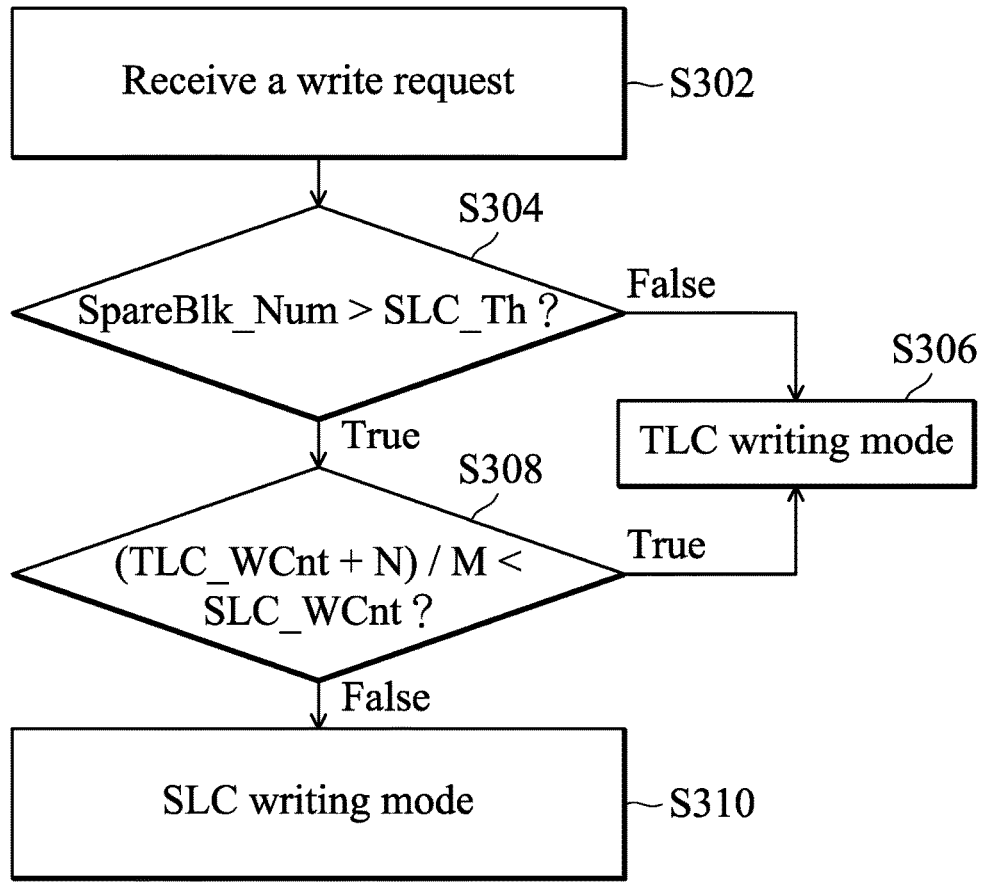
FIG. 3 is a flowchart illustrating how the microcontroller 204 operates the flash memory 202 according to the judgment formulas (1) and (2)

FIG. 3 is a flowchart illustrating how the microcontroller 204 operates the flash memory 202 according to the judgment formulas (1) and (2). In step S302, the microcontroller 204 receives a write request from the host 206. In step S304, the microcontroller 204 checks the judgment formula (2). When the judgment formula (2) is not true, the flash memory 202 is not rich in space and the microcontroller 204 allocates the blocks as TLC blocks to store data from the host 206 by the TLC writing mode according to step S306. When the judgment formula (2) is true, the flash memory 202 is rich in space and the microcontroller 204 further checks the judgment formula (1). When the accumulated amount SLC_WCnt of data written to the nonvolatile memory in the SLC writing mode is not large enough to make the judgment formula (1) true, step S310 is performed and the microcontroller 204 allocates blocks to store the data from the host 206 in the SLC writing mode to make good use of the high reliability and high writing speed of SLC writing.

Figure 4:
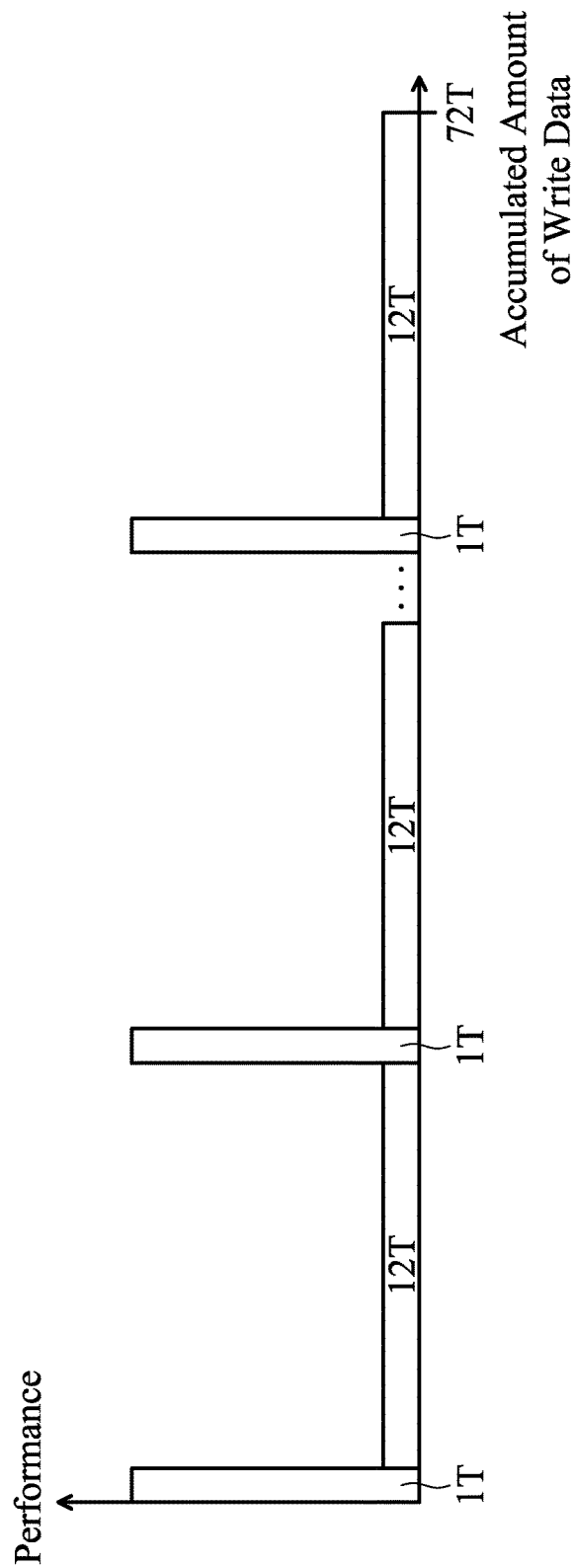
FIG. 4 depicts a performance diagram based on the aforementioned judgment formulas (1) and (2) with a horizontal axis showing an accumulated amount of writing data and a vertical axis showing the performance of data storage device 200.

FIG. 4 depicts a performance diagram based on the aforementioned judgment formulas (1) and (2) with a horizontal axis showing an accumulated amount of writing data and a vertical axis showing the performance of data storage device 200. The SLC writing mode is applied in an interleaving way. There is still a chance to store data in the SLC writing mode even when approaching the end of the lifespan (e.g., after nearly 72T data writing) of the data storage device 200. As shown in this performance diagram, data is written by the SLC writing mode and TLC writing mode alternately. Considering the actual operations of the data storage device 200, the 1T SLC writing may be more finely divided and spread over the 13T writing period (which includes 1T SLC writing and 12T TLC writing).

A special operation of the data storage device 200 is discussed in this paragraph. Only a small amount of data is written to the flash memory 202 and data at a particular logical address is repeatedly updated. Due to the judgment formula (1), the flash memory 202 does not fully use the SLC writing mode to receive data from the host 206 although the storage space of the flash memory 202 is quite sufficient. The flash memory 202, therefore, is protected from premature damage due to write amplification of SLC writing technology.

Another special operation of the data storage device 200 is discussed in this paragraph. The host 206 requests to write a large amount of data. Due to the judgment formula (1), the flash memory 202 does not fully use the SLC writing mode at the beginning of the large data writing. The judgment formula (2) may be kept satisfied for a period of time. Although a considerable amount of data has to be written to the flash memory 202, the data storage device 200 still has a chance to store the write data in SLC writing mode after a period of data writing, benefited by the high reliability and the high write speed of the SLC writing mode.

In another exemplary embodiment, the judgment formula (1) to be checked for switching from the SLC writing mode to the TLC writing mode may be slightly modified. The ratio of the accumulated amount SLC_WCnt and the accumulated amount TLC_WCnt can be controlled by other judgments. In an exemplary embodiment, it is determined whether the accumulated amount SLC_WCnt exceeds a dynamic criterion (dynamic threshold value). This dynamic criterion varies with the accumulated amount TLC_WCnt. When the accumulated amount SLC_WCnt exceeds the dynamic criterion, the microcontroller 204 switches the SLC writing mode to the TLC writing mode to allocate the blocks in a proper way for storing write data requested by the host 206.

In another exemplary embodiment, the microcontroller 204 operates the flash memory 202 to switch between the SLC writing mode and another writing mode that uses one storage cell to store more or less bits of data. For example, one storage cell of the flash memory 202 may be allocated to store two bits and is called a multiple level cell (MLC). The microcontroller 204 may operate the flash memory 202 to switch between an SLC writing mode and an MLC writing mode. In another exemplary embodiment, the microcontroller 204 may operate the flash memory 202 to switch among three or more kinds of writing modes. The microcontroller 204 may operate the flash memory 202 to switch among an SLC writing mode, an MLC writing mode and a TLC writing mode. In addition, as technology evolves, the technology of storing more bits of data in a single storage cell can also be applied to the present case. The MLC and TLC techniques described above can also be replaced by other numerical multi-level cell techniques.

Other techniques that use the aforementioned concepts to operate a nonvolatile memory are within the scope of the disclosure. Based on the above contents, the present invention further relates to methods for operating a nonvolatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a nonvolatile memory; and
   a microcontroller, allocating the nonvolatile memory to store write data requested by a host,
   wherein:
   according to a first accumulated amount of data written to the nonvolatile memory in a first writing mode and a second accumulated amount of data written to the nonvolatile memory in a second writing mode, the microcontroller allocates the nonvolatile memory to store write data requested by the host in the first writing mode and in the second writing mode alternately; and
   in comparison with the first writing mode, more bits of data are stored in one storage cell in the second writing mode.

2. The data storage device as claimed in claim 1, wherein:
   when the first accumulated amount of data written to the nonvolatile memory in the first writing mode exceeds a dynamic threshold value, the microcontroller escapes from the first writing mode to allocate the nonvolatile memory to store write data requested by the host in the second writing mode; and
   the dynamic threshold value depends on the second accumulated amount of data written to the nonvolatile memory in the second writing mode.

3. The data storage device as claimed in claim 2, wherein:
   the microcontroller escapes from the first writing mode to allocate the nonvolatile memory to store write data requested by the host in the second writing mode when a judgment is true,
   the judgment determines whether a value, (WCnt#2+N)/M, is smaller than a value WCnt#1, wherein WCnt#1 is the first accumulated amount of data written to the nonvolatile memory in the first writing mode;

WCnt#2 is the second accumulated amount of data written to the nonvolatile memory in the second writing mode; and N and M are numbers, and (WCnt#2+N)/M is the dynamic threshold value.

4. The data storage device as claimed in claim 3, wherein:
N and M are provided to satisfy warranty requirements of the data storage device.

5. The data storage device as claimed in claim 4, wherein:
the nonvolatile memory is a flash memory; and
N and M further depend on a total amount of blocks of the flash memory, block size, and an upper limit of an erasure count of each block.

6. The data storage device as claimed in claim 2, wherein:
the microcontroller allocates the nonvolatile memory to store write data requested by the host in the first writing mode when a spare space waiting to be allocated for data storage in the nonvolatile memory is larger than a threshold size for switching to the first writing mode.

7. The data storage device as claimed in claim 6, wherein:
the microcontroller allocates the nonvolatile memory to store write data requested by the host in the second writing mode when the spare space waiting to be allocated for data storage in the nonvolatile memory is not larger than the threshold size.

8. The data storage device as claimed in claim 2, wherein:
the nonvolatile memory is a flash memory;
the first writing mode is a single-level cell writing mode, by which each storage cell of an allocated block stores one bit of data; and
according to the second writing mode, each storage cell of an allocated block stores multiple bits of data.

9. The data storage device as claimed in claim 8, wherein:
the second writing mode is a triple-level cell writing mode, by which each storage cell of an allocated block stores data of three bits.

10. The data storage device as claimed in claim 9, wherein:
when the host does not request access to the flash memory, the microcontroller moves data stored in single-level cells to blocks storing data in triple-level cells.

11. A method for operating a nonvolatile memory, comprising:
allocating a nonvolatile memory to store write data requested by a host; and
according to a first accumulated amount of data written to the nonvolatile memory in a first writing mode and a second accumulated amount of data written to the nonvolatile memory in a second writing mode, allocating the nonvolatile memory to store write data requested by the host in the first writing mode and in the second writing mode alternately,
wherein, in comparison with the first writing mode, more bits of data are stored in one storage cell in the second writing mode.

12. The method as claimed in claim 11, further comprising:
when the first accumulated amount of data written to the nonvolatile memory in the first writing mode exceeds a dynamic threshold value, escaping from the first writing mode to allocate the nonvolatile memory to store write data requested by the host in the second writing mode,
wherein the dynamic threshold value depends on the second accumulated amount of data written to the nonvolatile memory in the second writing mode.

13. The method as claimed in claim 12, further comprising:
escaping from the first writing mode to allocate the nonvolatile memory to store write data requested by the host in the second writing mode when a judgment is true,
wherein:
the judgment determines whether a value, (WCnt#2+N)/M, is smaller than a value WCnt#1;
WCnt#1 is the first accumulated amount of data written to the nonvolatile memory in the first writing mode;
WCnt#2 is the second accumulated amount of data written to the nonvolatile memory in the second writing mode; and
N and M are numbers, and (WCnt#2+N)/M is the dynamic threshold value.

14. The method as claimed in claim 13, wherein:
N and M are provided to satisfy the warranty requirements of a data storage device equipped with the nonvolatile memory.

15. The method as claimed in claim 14, wherein:
the nonvolatile memory is a flash memory; and
N and M further depend on the total amount of blocks of the flash memory, block size, and an upper limit of an erasure count of each block.

16. The method as claimed in claim 12, further comprising:
allocating the nonvolatile memory to store write data requested by the host in the first writing mode when a spare space waiting to be allocated for data storage in the nonvolatile memory is larger than a threshold size for switching to the first writing mode.

17. The method as claimed in claim 16, further comprising:
allocating the nonvolatile memory to store write data requested by the host in the second writing mode when the spare space waiting to be allocated for data storage in the nonvolatile memory is not larger than the threshold size.

18. The method as claimed in claim 12, wherein:
the nonvolatile memory is a flash memory;
the first writing mode is a single-level cell writing mode, by which each storage cell of an allocated block stores one bit of data; and
according to the second writing mode, each storage cell of an allocated block stores multiple bits of data.

19. The method as claimed in claim 18, wherein:
the second writing mode is a triple-level cell writing mode, by which each storage cell of an allocated block stores data of three bits.

20. The method as claimed in claim 19, further comprising:
moving data stored in single-level cells to blocks storing data in triple-level cells when the host does not request access to the flash memory.

* * * * *